(No Model.)

T. B. ATTERBURY.
MOLD FOR MANUFACTURING GLASS LAMPS AND OTHER ARTICLES.

No. 275,563. Patented Apr. 10, 1883.

Witnesses:

Inventor:
Thos. B. Atterbury,
By T. C. Brecht
Attorney.

United States Patent Office.

THOMAS B. ATTERBURY, OF PITTSBURG, PENNSYLVANIA.

MOLD FOR MANUFACTURING GLASS LAMPS AND OTHER ARTICLES.

SPECIFICATION forming part of Letters Patent No. 275,563, dated April 10, 1883.

Application filed March 8, 1883. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in Molds for the Manufacture of Glass Lamps and other Articles; and I do hereby declare the following to be a full, clear, and exact description of the invention, such as will enable others skilled in the art to which it appertains to make and use the same.

My invention relates to the manufacture of glass lamp-bowls, lamp-founts, and other articles of glass where a projecting flange is required to form a drip-cup which will prevent the oil, when the lamp is being filled, and the contents of the vessel from running or dripping down over the sides onto the stem or holder; and to this end my invention consists of a mold for forming the article having the bottom portion in one or more pieces and horizontally-hinged top sections for folding down onto the glass article when it is partially formed and at a welding heat, so as to crimp or fold the glass and form on the article a projecting flange or flanges.

My invention consists, further, in certain details of construction, hereinafter more fully set forth, and pointed out in the claims.

Figure 1:
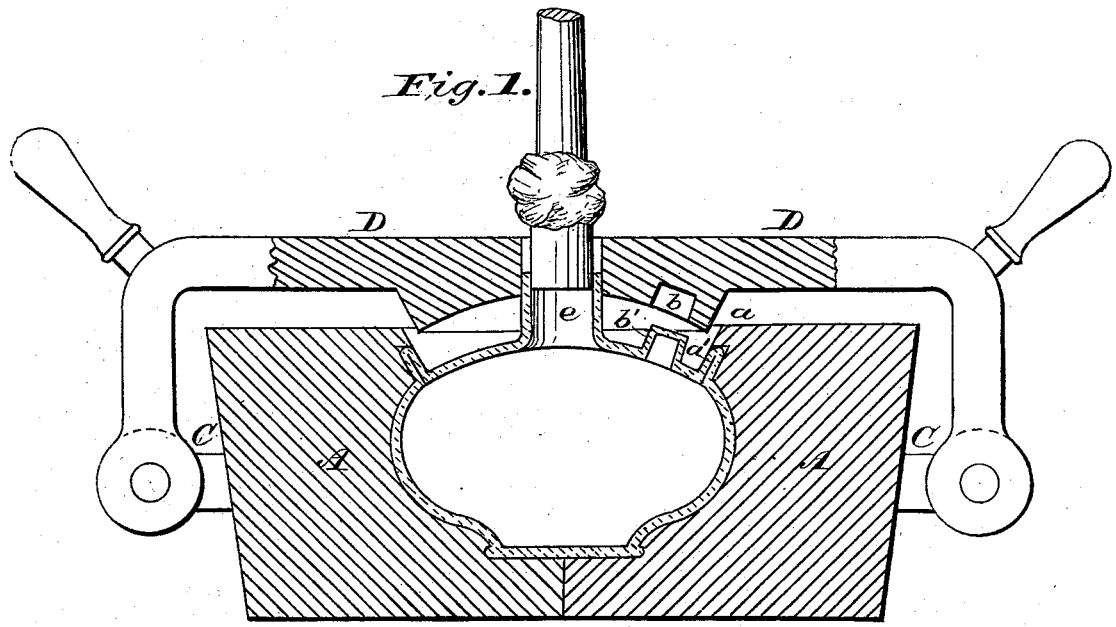
Figure 2:
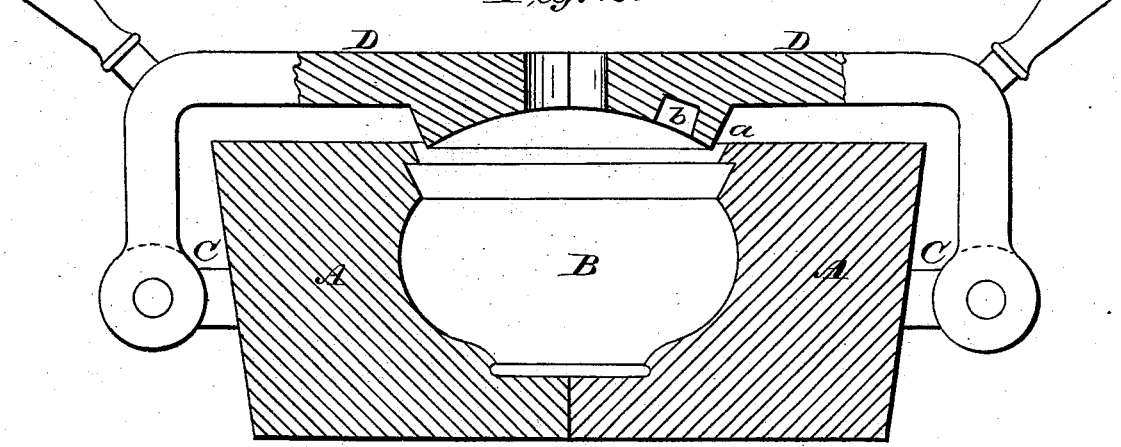

Referring to the drawings, Figure 1 is a sectional view of the mold with the article formed therein. Fig. 2 is a sectional view of the mold with the article removed.

To enable others skilled in the art to make and use my invention, I will now proceed to describe its construction and mode of operation.

A A indicate the sections of an ordinary two-part mold, with the usual handles and the usual cavity, B, formed therein for giving to the sides and bottom of the article the desired form, of whatever configuration. The top of the cavity B is made flaring, and is provided with a projecting ledge, $a$, which serves as a stop for arresting the upward flow of the glass as the article is being blown, and also as a guide by which the blower is enabled to determine the height or extent to which the lower portion of the article is to be blown. A base or stand may be employed in connection with the mold-sections A A of the usual or any desired form or construction, so as to give the desired form to the base of the lamp bowl or fount.

C C are lugs secured in the sides of the sections A A, to which are hinged the lids or top portions, D D, of the mold, which, when folded down in position, folds the glass upon itself while at a welding-heat, and gives to the top of the article the desired form. The lids or tops of the mold are secured to the stems or arms E, which are hinged to the lugs C C, so that their rear ends will stand below and a short distance from the lower sections, A A, of the mold, by which arrangement the lids, in folding back from the finished article or in folding forward to form a fold or crimp in the article, will approach or recede from the article in comparatively a straight line, and will not drag upon or distort the article.

In operating the mold just described the lids or tops are thrown back in a horizontal position. The bulb of glass is inserted into the mold-cavity B and blown until the bulb reaches the offset $a$, when the tops or lids are turned down and impinge on the upper side of the partially-formed article, folding it down onto the formed portion of the article while at a welding heat, as shown at $a'$ in Fig. 1, so as to form a solid flange of a double thickness of glass. After the lids or tops have been folded down, and while the glass is still hot and pliable, the blowing process is continued, so that the top of the glass article will conform to the shape of the under side of the lid, filling in around the cavity $b$, so as to form on the article a projecting portion, $b'$, so that when the film of glass which covers said projection is removed, a filling-orifice will be formed in the top of the lamp bowl or fount.

By this process I am enabled to form a blown-glass lamp bowl or fount having on its upper surface a drip flange or projection, $c$, and a filling-orifice, $d$. It will be observed that the parts of the flange are folded together while in a hot and welding condition to form the flange $c$, and that such flange or ring is composed of a double thickness of glass, which makes the flange much stronger, and the globe or fount is not so liable to be broken at that point.

Lamps of this class have heretofore been made by pressing the lower portion of the bowl with a flange projecting out from the body of the article, the top portion being afterward reheated and gathered in to form the top portion and the projection to which the fixtures of the lamp are attached; but such a process is tedious and expensive, and requires the services of a skilled workman to gather in or shape the top portion. Another method of manufacturing lamps with drip-flanges thereon is to make the mold with a separable top, having on its under side a groove, into which the glass is blown to form the flange; but in such cases the glass catches and adheres more or less to the corners of the groove, and by the continued blowing the glass which lies across the groove is forced up into the groove in a comparatively thin body, so that the upper portion of the flange is much thinner than the other portions of the article. A further objection to this internal groove is that it is difficult to clean the lamp. Any sediment which may have found its way into the lamp, together with the water used in washing the lamp, will be caught and retained in said groove even when the lamp is inverted.

In the last-described process, reference is specially made to the Patent of H. Dillaway, No. 117,157 of July 18, 1871.

By my process the flange formed by doubling or folding the glass upon itself while hot and causing the folded sides to adhere to each other forms practically a solid flange, with no cavities in which the dirt and water might lodge. Furthermore, by this plan of making a flanged fount or lamp-bowl the article is practically finished at one and the same operation—viz., the operation of blowing. It may, however, be necessary to fire-polish and finish the upper portion to receive the burner and wick-holding devices, as is usually done in this class of work.

Having thus described my invention, what I claim, and desire to secure by Letters Patent, is—

1. The glass-mold herein described, consisting of the bottom portions, A A, provided with the cavity B and flange a, in combination with the horizontally-hinged top sections, D D, whereby, when the article is partially formed, the sides are crimped or folded by closing the top sections, so as to form a projecting flange, as set forth.

2. A glass-mold provided with the flange a, in combination with the horizontally-hinged top sections, when constructed, substantially as described, so as to form a crimp or fold in the article, as set forth.

In testimony whereof I hereby affix my signature in presence of two witnesses.

THOS. B. ATTERBURY.

Witnesses:
D. P. BERG,
G. STENGEL.